May 15, 1956  M. F. PENNOCK  2,745,459
AIR COOLED TIRE
Filed Feb. 12, 1954
FIG. 1.
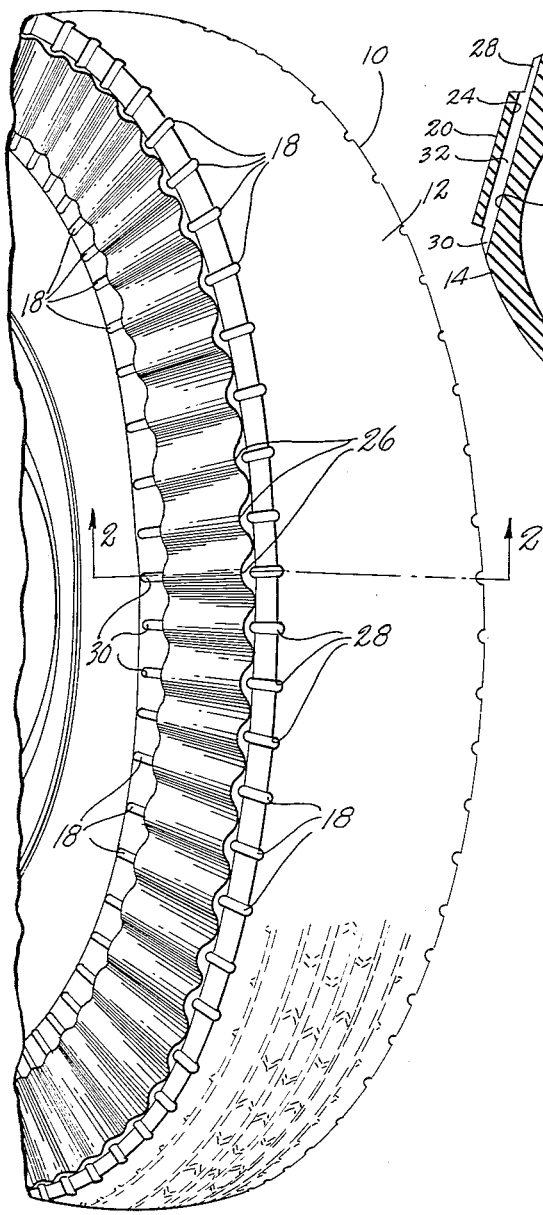
FIG. 2.
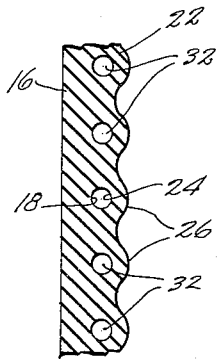
FIG. 3.
INVENTOR.
MILTON F. PENNOCK,
BY
McMorrow, Berman & Davidson
ATTORNEYS.

United States Patent Office 2,745,459
Patented May 15, 1956

2,745,459
AIR COOLED TIRE

Milton F. Pennock, Elk Grove, Calif.

Application February 12, 1954, Serial No. 409,834

2 Claims. (Cl. 152—153)

This invention relates to tires and more particularly to air cooled tires.

The primary object of this invention is to provide a tire casing which is provided with means whereby the heat generated in the interior of the tire may be dissipated thus providing cool tire operation.

It is a further object of this invention to provide a tire in which the internal heat generated is dissipated and thereby minimize the danger of blow-outs during high speed driving.

Other objects and advantages will become apparent from the following detailed description, forming the specification, and in conjunction with the accompanying drawing, wherein:

Figure 1 is a partial perspective view of a tire embodying the concept of this invention;

Figure 2 is a transverse cross sectional view taken on line 2—2 of Figure 1; and Figure 3 is a cross sectional view taken on line 3—3 of Figure 2.

With continued reference to the drawing, there is shown the casing 10 of a tire having the usual tread 12 and side walls 14 and 16. Each of the side walls are provided with a plurality of radially extending, spaced channels 18 on the outer surfaces thereof. Each of the side walls 14 and 16 have formed integrally therewith identical undulating, annular covers 20 and 22 respectively. Each of the covers have circumferentially spaced openings 24 transversely therethrough, the openings 24 being in registering overlying relation with respective ones of the channels 18 so that there is provided in registering overlying relation to each of the channels 18 an opening 24 formed in the covers 20 and 22 respectively, to define radial air passages through which the air may freely circulate while the tire is rotating to dissipate heat generated in the interior of the tire.

Each of the covers 20 and 22 have spaced transverse ribs 26 thereon with each of the ribs being transversely aligned with one of the air passages, and the channels 18 extending beyond the respective covers 20 and 22 at both ends thereof to define along with the respective ends of the ribs 26 air outlet and intake passages 28 and 30 in the respective side walls 14 and 16 at opposite ends of the ribs 26 conducting flow of air through the passages upon rotation of the tire so as to insure a constant air flow therethrough.

Thus by providing the outlet and intake passages 28 and 30 at opposite ends of the radial air passages 32 defined by the grooves 24 transversely registering with and overlying the channels 18, any dirt or mud collecting in the air passages 32 will be cleared by the force of the air induced to flow through the air passages through the intake passages 30 by the centrifugal force and radial air flow due to the rotation of the tire itself.

It will be appreciated that the faster a vehicle upon which a tire having the casing 10 thereon travels the greater the flow of air through the air passages 32 will be to thereby completely dissipate heat generated within the tire due to its frictional engagement with the surface upon which the vehicle is traveling.

It will be noted that the covers 20 and 22 are disposed medially of the radial, spaced channels 18 and each of the covers is concentric to the axis of rotation of the tire and the casing 10.

While there is shown and described the preferred embodiment of the invention, it is to be understood that the structure is susceptible to change and modification within the practicability of the invention and therefore should be limited only by the scope of the claims appended hereto.

What is claimed is:

1. An air cooled pneumatic tire casing of resilient material comprising a tread and side walls, each of said side walls having radially extending and circumferentially spaced channels therein opening longitudinally on its outer side wall surface, an annular undulating cover integral with each of said side walls extending outwardly therefrom, said cover having circumferentially spaced openings extending radially therethrough in registering overlying relation to said channels to define therewith radially extending air passages for cooling a tire by dissipating heat generated in the interior of the tire.

2. An air cooled pneumatic tire casing of resilient material comprising a tread and side walls, each of said side walls having radially extending and circumferentially spaced channels therein opening longitudinally on its outer side wall surface, an annular undulating cover integral with each of said side walls extending outwardly therefrom, said cover having circumferentially spaced openings extending radially therethrough in registering overlying relation to said channels to define therewith radially extending air passages for cooling a tire by dissipating heat generated in the interior of the tire, said cover having circumferentially spaced and radially extending ribs thereon, each of said ribs being in alignment with one of said air passages, said channels extending beyond said cover at both ends thereof to define along with the respective ends of said ribs air intake and outlet passages.

References Cited in the file of this patent

UNITED STATES PATENTS

| | | |
|---|---|---|
| 2,143,528 | Thomas | Jan. 10, 1939 |
| 2,146,942 | Czerwin | Feb. 14, 1939 |
| 2,311,999 | Purvis | Feb. 23, 1943 |